United States Patent [19]

Kitamura

[11] Patent Number: 4,952,105
[45] Date of Patent: Aug. 28, 1990

[54] MACHINE TOOL

[75] Inventor: Koichiro Kitamura, Takaoka, Japan

[73] Assignee: Kitamura Machinery Co., Ltd., Japan

[21] Appl. No.: 384,810

[22] Filed: Jul. 25, 1989

[51] Int. Cl.⁵ .......................................... B23Q 11/14
[52] U.S. Cl. ............................ 409/135; 51/165.73; 82/900; 408/234
[58] Field of Search .............. 409/131, 132, 135, 226, 409/231, 232, 233, 234, 199, 200; 408/234; 82/900; 51/165.73

[56] References Cited

U.S. PATENT DOCUMENTS 2,834,259  5/1958  Capetti ........................... 409/226 X
3,066,578  12/1962  Olton ................................. 409/131
3,692,418  9/1972  Kopelev ........................... 82/900 X Primary Examiner—Z. R. Bilinsky
Attorney, Agent, or Firm—Lorusso & Loud

[57] ABSTRACT

A machine tool has a bed (1), a table (2), a column (3), a spindle head (4) movable along the column (3), a spindle (12) rotatably supported by the spindle head (4). The machine tool also has in the spindle head (4) a double structure having an inner wall (21), an outer wall (20) and an oil space formed between them. A cooling oil (22) through the oil space so as to cool the spindle head (4).

5 Claims, 3 Drawing Sheets

MACHINE TOOL

BACKGROUND OF THE INVENTION

This invention relates to a machine tool having a spindle head.

In order to increase machining efficiency, a spindle of a machine tool is designed to operate at a high speed. If the spindle rotates at a high speed for a long time, a lot of heat is produced at bearings, gears and other related members. As a result, the spindle and the spindle head supporting it are apt to deform due to the heat so as to decrease machining precision.

SUMMARY OF THE INVENTION

The object of this invention is to provide a machine tool having a spindle, a spindle head for supporting the spindle and a jacket for cooling the spindle head with a cooling medium such as a cooling oil.

DESCRIPTION OF THE EMBODIMENT

Figure 1:
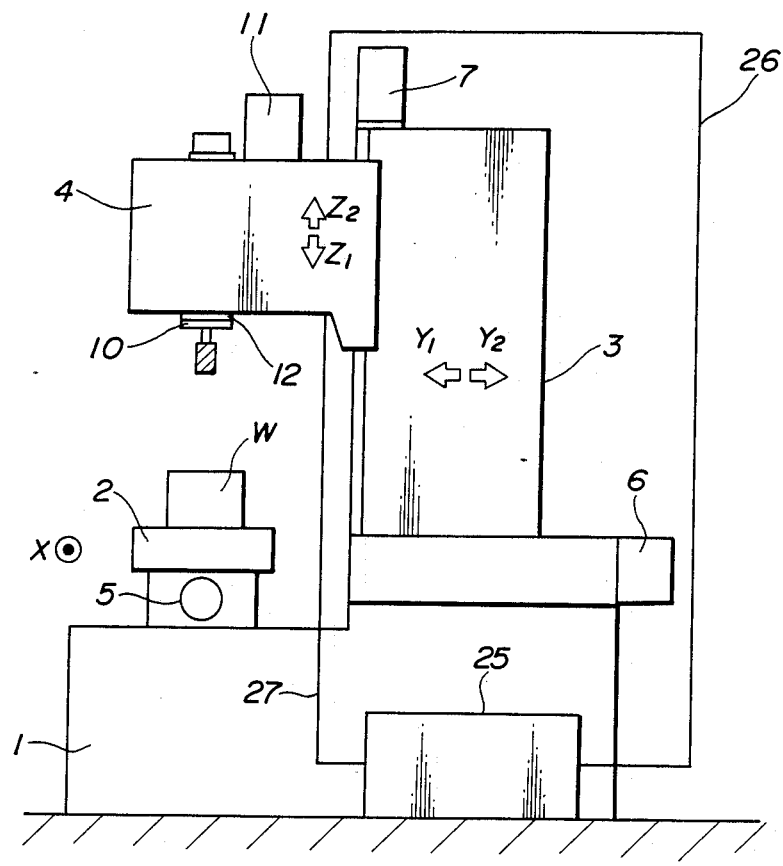
FIG. 1 is a schematic side view showing a machine tool according to an embodiment of this invention.

Referring to FIG. 1, a machine tool comprises a bed 1, a table 2, a column 3 and a spindle head 4. The table 2 is set on the bed 1 in such a manner that the table 2 can be moved horizontally in the direction of arrow X by means of a motor 5. The column 3 can be moved horizontally in the direction of arrow Y1 or arrow Y2 by means of a motor 6. The spindle head 4 can be moved up and down in the direction of arrows Z1 and Z2 by means of a motor 7 along a vertical side of the column 3.

Figure 2:
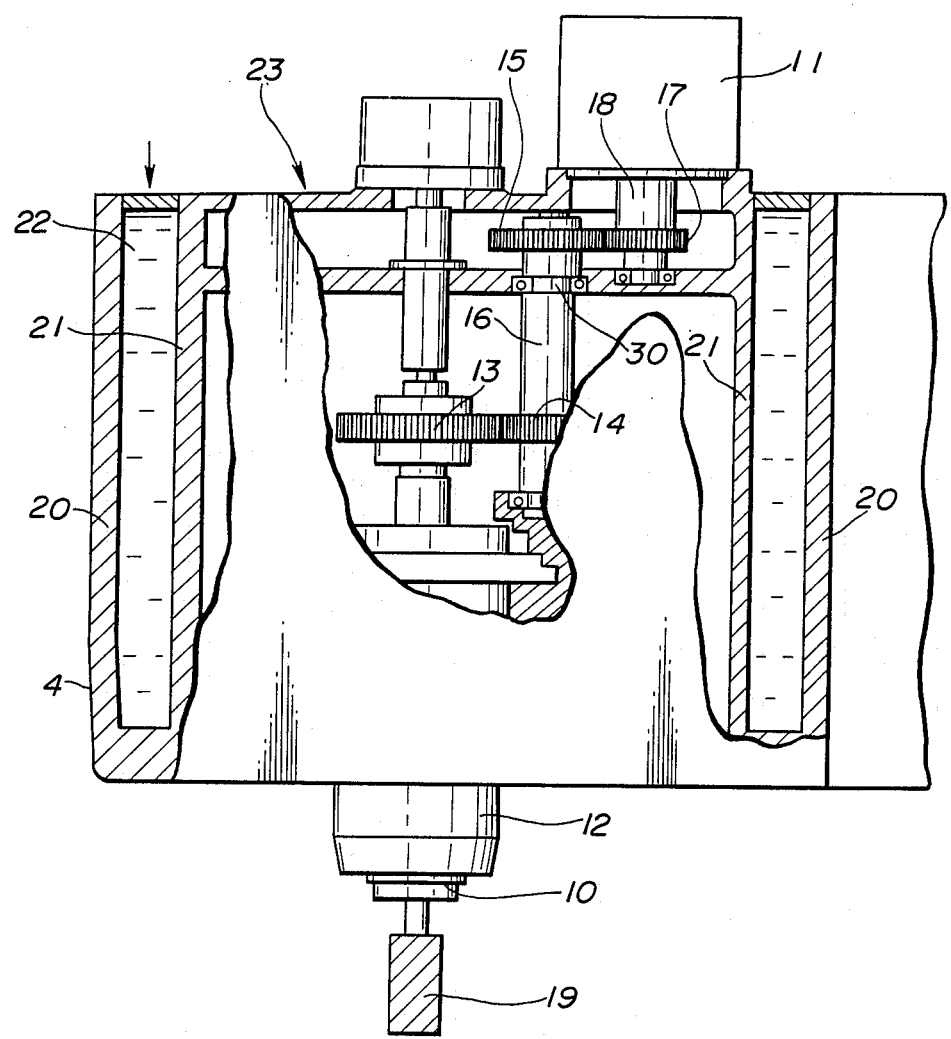
FIG. 2 is a side view, partially in cross-section showing the spindle head of the machine tool shown in FIG. 1.

Referring to FIG. 2, the spindle head 4 rotatably supports a spindle 12. The spindle 12 has a gear 13 which engages a gear 14 fixed to a shaft 16. A gear 15 fixed to the shaft 16 engages a gear 17 fixed to an output shaft 18 of a motor 11. When the shaft 18 revolves, the torque of the motor 11 is transmitted to the spindle 12 via the gears 17, 15, 14, 13.

Figure 3:
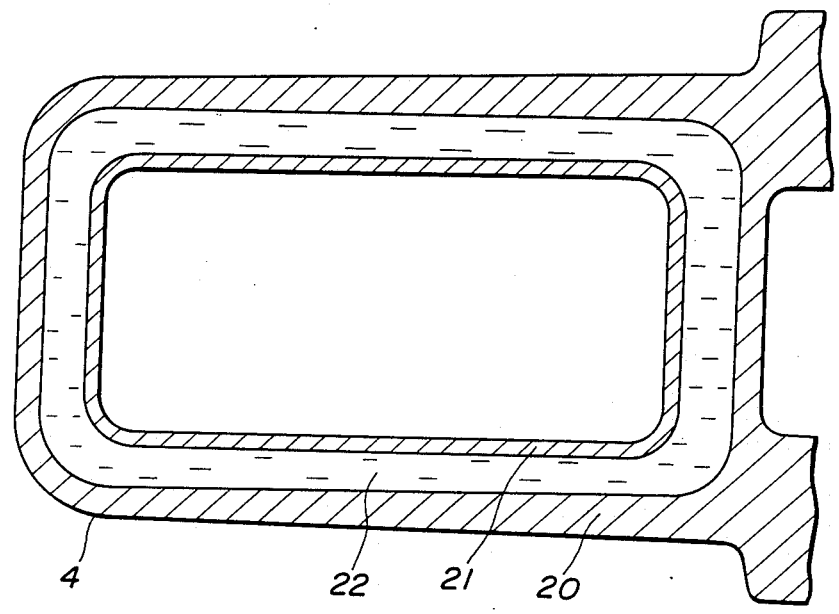
FIG. 3 shows a horizontal section of the spindle head.

A tool holder 10 is detachably attached to a lower end of the spindle 12. A tool 19 is set in the tool holder 10. As shown in FIGS. 2 and 3, the spindle head 4 is designed to have a double wall structure which includes an outer wall or jacket 20, an inner wall or casing 21 and a circular or ring-shaped oil space formed therebetween. The inner wall 21 functions as a gear box 23 for the gears 13 to 17 and others. The inner wall 21 is formed in the shape of a rectangular parallelopiped. The oil space extends substantially over the full height of the inner wall 21 as best shown in FIG. 2. The side portion of the inner wall 21 is completely encircled by the oil space as shown in FIG. 3.

As shown in FIG. 1, the cooling oil 22 is fed from an oil tank 25 into the oil space between the outer and inner walls, by way of a line 27. Further, the cooling oil 22 is returned from the oil space to the oil tank 25 by way of a line 26.

In summary, the cooling oil 22 is circulated so as to flow through the oil space between the outer wall 20 and the inner wall 21 of the spindle head 4 whereby the spindel head 4 can be cooled.

In operation, the table 2 is set in a desired position. The column 3 moves horizontally, and the spindle head 4 moves down so that the work W on the table 2 can be machined while the spindle 12 revolves at a high speed. Thus, a lot of heat is produced at the engaging portions of the gears 13 to 17, bearings 30 and others. As a result, the temperature of the gear box 23 increases. Thus, the spindle head 4 might be apt to be deformed due to the heat. However, as the cooling oil 22 flows through the spindle head 4 and particularly the oil space therein, the heat is effectively transferred to the cooling oil 22 so that the temperature of the gear box 23 does not increase too much. Therefore, deformation of the spindle head or gear box is avoided and work can be precisely machined by the tool 19.

This invention is not limited to the disclosed embodiment only. For example, this invention can be applied to any type machine including a wood-working machine.

I claim:

1. A machine tool comprising:
   a bed;
   a table movable mounted on said bed for movement, relative to said bed, in a horizontal plane;
   a vertical column mounted on said bed;
   a spindlehead mounted on said vertical column for vertical movement along said column, said spindlehead including a casing having a circumferential side wall portion, a spindle rotatably mounted on and extending from said casing and spindle drive means, housed within said casing, for rotatably driving said spindle;
   a jacket surrounding and spaced from said circumferential side wall portion thereby defining a fluid space therebetween;
   means for circulating a coolant through said fluid space; and
   motor drive means for powering said spindle drive means.

2. A machine tool in accordance with claim 1 wherein said casing and said spindle drive means constitute a gearbox.

3. A machine tool in accordance with claim 1 wherein said side wall portion is vertical and wherein said jacket is vertically coextensive with said side wall portion.

4. A machine tool in accordance with claim 3 wherein said casing and said jacket are each substantially a rectangular parallelopiped.

5. A machine tool in accordance with claim 1 wherein said table is mounted for horizontal movement in a first direction relative to said bed and said vertical column is movable mounted on said bed for horizontal movement, in a second direction, relative to said bed, said first direction being perpendicular to said second direction.

* * * * *

UNITED STATES PATENT AND TRADEMARK OFFICE
CERTIFICATE OF CORRECTION

PATENT NO. : 4,952,105
DATED : August 28, 1990
INVENTOR(S) : Koichiro KITAMURA

It is certified that error appears in the above-identified patent and that said Letters Patent is hereby corrected as shown below:

Col. 1, line 49, after "10." begin a new paragraph.

Col. 2, line 28, "movable" should read --movably--.

Signed and Sealed this

Seventh Day of April, 1992

Attest:

HARRY F. MANBECK, JR.

*Attesting Officer*   *Commissioner of Patents and Trademarks*